(12) United States Patent
Mochizuki et al.

(10) Patent No.: US 7,394,447 B2
(45) Date of Patent: Jul. 1, 2008

(54) ELECTRO-OPTICAL DEVICE AND ELECTRONIC APPARATUS

(75) Inventors: Hiroaki Mochizuki, Chino (JP); Masahide Uchida, Suwa (JP); Yasuji Yamasaki, Chino (JP)

(73) Assignee: Seiko Epson Corporation, Tokyo (JP)

( * ) Notice: Subject to any disclaimer, the term of this patent is extended or adjusted under 35 U.S.C. 154(b) by 692 days.

(21) Appl. No.: 10/909,560

(22) Filed: Aug. 3, 2004

(65) Prior Publication Data
US 2005/0052390 A1 Mar. 10, 2005

(30) Foreign Application Priority Data
Aug. 28, 2003 (JP) .............................. 2003-304586

(51) Int. Cl.
G09G 3/36 (2006.01)
(52) U.S. Cl. ........................................ 345/100; 345/92
(58) Field of Classification Search ................. 345/204, 345/206, 211, 100
See application file for complete search history.

(56) References Cited

U.S. PATENT DOCUMENTS

| 6,377,235 | B1 * | 4/2002 | Murade et al. ............... 345/100 |
| 6,448,953 | B1 * | 9/2002 | Murade ........................ 345/98 |
| 7,027,028 | B2 * | 4/2006 | Ishii ............................ 345/98 |

FOREIGN PATENT DOCUMENTS

| JP | A 07-294870 | 11/1995 |
| JP | A 10-010572 | 1/1998 |
| JP | A 10-268350 | 10/1998 |
| JP | A 2000-148067 | 5/2000 |
| JP | A 2002-040486 | 2/2002 |
| JP | A 2002-49052 | 2/2002 |
| JP | A 2002-049330 | 2/2002 |
| JP | A-2002-049331 | 2/2002 |
| JP | A 2002-49331 | 2/2002 |
| JP | A-2002-049357 | 2/2002 |
| JP | A 2002-49357 | 2/2002 |
| JP | A-2002-148067 | 5/2002 |
| JP | A 2003-177376 | 6/2003 |
| JP | A 2002-49357 | 2/2005 |

* cited by examiner

Primary Examiner—Bipin Shalwala
Assistant Examiner—Afroza Y Chowdhury
(74) Attorney, Agent, or Firm—Oliff & Berridge, PLC

(57) ABSTRACT

Aspects of the invention can provide an electro-optical device having n image signal lines to which n serial to parallel converted image signals are supplied. A driving circuit has a sampling circuit that can include a plurality of thin film transistors. Each of the thin film transistors can have (i) a drain connected to a drain wiring line arranged from a data line in a direction in which the data line extends, (ii) a source connected to a source wiring line arranged from the image signal line in a direction in which the data line extends, and (iii) a gate arranged to be sandwiched between the drain wiring line and the source wiring line in a direction in which the data line extends, and the plurality of thin film transistors can be arranged to correspond to the plurality of data lines. Two adjacent thin film transistors with the boundary between thin film transistor groups interposed therebetween among the plurality of thin film transistors can be arranged such that the arrangements of the source and drain wiring lines with a gate interposed therebetween are opposite to each other. By doing so, it is possible to reduce image faults caused by parasitic capacitance located between the thin film transistors in the sampling circuit.

8 Claims, 16 Drawing Sheets

ELECTRO-OPTICAL DEVICE AND ELECTRONIC APPARATUS

BACKGROUND OF THE INVENTION

1. Field of Invention

Aspects of the invention relate to a driving circuit of electro-optical devices, such as a liquid crystal device, to an electro-optical device, and to an electronic apparatus, such as a liquid crystal projector, having the electro-optical device installed therein.

2. Description of Related Art

Related, these types of driving circuits can have a data line driving circuit for driving data lines, a scanning line driving circuit for driving scanning lines, and a sampling circuit for sampling image signals formed above a substrate of an electro-optical device, such as a liquid crystal device. In addition, when driving the related driving circuits, at the timing of sampling circuit driving signals supplied from the data line driving circuit, the sampling circuit can sample an image signal supplied to image signal lines and supplies the sampled signals to the data lines.

In a technology for obtaining high-definition image display while suppressing an increase in driving frequency, serial image signals can be converted into a plurality of parallel image signals of three phases, six phases, twelve phases, twenty four phases, etc. (that is, phase development), and then the converted signals can be supplied to a corresponding electro-optical device through a plurality of image signal lines. Here, the image signals are simultaneously sampled by a plurality of sampling switches and the sampled signals are simultaneously supplied to the plurality of data lines.

SUMMARY OF THE INVENTION

In the invention, such a conversion is referred to as a serial to parallel conversion. However, according to the driving circuit for simultaneously driving the plurality of data lines, image signal interference between the pixel rows along the data lines is commonly generated by the parasitic capacitance located between thin film transistors (hereinafter, referred as to TFTs) used as sampling switches that constitute the sampling circuit. As a result, a fault in image display may be caused.

Further, there can be a technical problem in that an image fault, such as a ghost image or crosstalk is frequently generated at the boundary between groups of simultaneously driven data lines. As such, an image fault, such as a ghost image is commonly caused by the parasitic capacitance located between two adjacent thin film transistors on either side of a boundary between groups of data lines simultaneously driven among the plurality of thin film transistors that constitutes a sampling circuit.

Aspects of the invention can provide a driving circuit for an electro-optical device, such as a liquid crystal device, an electro-optical device, and an electronic apparatus such as a liquid crystal projector which are capable of reducing the accurance of image faults caused by parasitic capacitances located between thin film transistors in the sampling circuit, which is formed at the boundary between groups of simultaneously driven data lines when a plurality of data lines is simultaneously driven.

A first driving circuit of an exemplary electro-optical device of the invention can include a plurality of scanning lines and a plurality of data lines arranged so as to cross each other in an image display region above a substrate, and a plurality of pixel portions connected to the plurality of scanning lines and the plurality of data lines, wherein on a peripheral area located on the periphery of the image display area on the substrate, n image signal lines are provided to which n (where n is a natural number equal to or greater than two) serial to parallel converted image signals are supplied. On the peripheral area of the image display area, a sampling circuit having a plurality of thin film transistors and a data line driving circuit can be provided.

Each thin film transistor has (i) a drain connected to a drain wiring line arranged from the data line in a direction in which the data line extends, (ii) a source connected to a source wiring line arranged from the image signal line in a direction in which the data line extends, and (iii) a gate arranged to be sandwiched between the drain wiring line and the source wiring line in a direction in which the data line extends. The plurality of thin film transistors are arranged to correspond to the plurality of data lines. The data line driving circuit supplies circuit driving signals to the gate of the thin film transistor in every group of n thin film transistors that are connected to n simultaneously driven data lines among the plurality of data lines, in which two thin film transistors adjacent to each other with the boundary between thin film transistor groups interposed therebetween among the plurality of thin film transistors are arranged such that arrangements of the source and drain wiring lines with the gate interposed therebetween are opposite to each other.

According to the exemplary first driving circuit of the invention, the drain, gate, and source wiring lines of the thin film transistors used as the sampling switches constituting the sampling circuit are arranged in a direction in which the data lines extend, that is, a vertical direction or a Y direction. In addition, the plurality of thin film transistors is arranged in a horizontal direction or an X direction corresponding to the plurality of data lines.

At the time of driving the first driving circuit, n serial to parallel converted (that is, phase-developed) image signals supplied to n image signal lines are respectively sampled in every group of the n thin film transistors constituting the sampling circuit, and the sampled signals are simultaneously supplied to n data lines. On the other hand, the scanning signals are sequentially supplied to the scanning lines from the scanning line driving circuit. In this manner, in every pixel portion comprising the pixel switching TFT, the pixel electrode, and a storage capacitance, the electro-optical operation such as liquid crystal driving is performed.

When simultaneously driving n data lines, because of the parasitic capacitance located between the thin film transistors adjacent to each other in the sampling circuit, the variations of the electric potential of the source and drain wiring lines of the thin film transistors that are connected to the n data lines simultaneously driven and the data lines adjacent to the n data lines affect to each other. As a result, ghost images or crosstalk can be generated. In addition, the parasitic capacitance that most adversely affects the display image among the parasitic capacitances located between the thin film transistors adjacent to each other in the sampling circuit is the parasitic capacitance located at the boundary of a thin film transistor group. In further detail, for the parasitic capacitance located between the thin film transistors adjacent to each other in the same group, only the ghost image between the lines (that is, the pixel rows along the data line) adjacent to each other at a narrow wiring-line pitch, for example, several micrometers to several tens of micrometers is displayed, and therefore, the ghost image is not noticeable. In contrast, for the parasitic capacitance between the thin film transistors adjacent to each other with the boundary of a thin film transistor group interposed therebetween, if no countermeasure is taken, the ghost image is readily visible.

In other words, when the source, gate, and drain wiring lines have the same arrangement in the entire sampling circuit, the first thin film transistor in the Mth group (M is a natural number) and the first thin film transistor in the (M+1)th group are all connected to a first image signal line. Here, due to the parasitic capacitance located between the last thin film transistor in the Mth group (hereinafter, referred to as "nth TFT") and the first thin film transistor in the (M+1)th group (hereinafter, referred to as "(n+1)th TFT"), (i) the variation from the electric potential of the first image signal is transmitted to the drain wiring line of the nth TFT from the source wiring line of the (n+1)th TFT. By doing so, when the nth TFT supplies the image signal of the nth image signal line to the data line, the variation of the electric potential corresponding to the image signal of the first image signal line that is transmitted from the source region of the (n+1)th TFT increases. Or, (ii) the variation of the electric potential of the nth image signal line is transmitted to the drain wiring line of the (n+1)th TFT from the source wiring line of the nth TFT. By doing so, when the (n+1)th TFT supplies the image signal of the first image signal line to the data line, the variation of the electric potential corresponding to the image signal on the nth image signal line that is transmitted from the source region of the nth TFT increases due to the parasitic capacitance located at the boundary. In particular, the image signal at the nth timing in the (M+1)th group is input to the first drain in the (M+1)th group via the nth source in the Mth group and then the ghost image at a distance of n−1 is visible.

In (i) or (ii), for example, in accordance with the darkness of the display image, a white line or a black line is displayed as the ghost image at the boundary between thin film transistor groups located between the first data line and the nth data line in every group because of the parasitic capacitance located at the above-mentioned boundary. In addition, the ghost image is at a distance equal to the width of the simultaneously driven data line group, for example, several micrometers to several tens of micrometers×(n−1), and therefore, the ghost image is visible.

However, according to the invention, the two adjacent thin film transistors (that is, nth TFT and (n+1)th TFT) located at the boundary of a group comprising the n thin film transistors that simultaneously drive the n data lines are arranged such that the arrangement of the source and drain wiring lines thereof with a gate interposed therebetween are opposite to each other. In other words, for example, when the source wiring line, the gate wiring line, and the drain wiring line are sequentially arranged in one of the two adjacent thin film transistors, the drain wiring line, the gate wiring line, and the source wiring line are sequentially arranged in the other of the two adjacent thin film transistors. Accordingly, the drain wiring line and the drain wiring line are adjacent to each other with the boundary between thin film transistor groups interposed therebetween. In addition, the source wiring line and the source wiring line are adjacent to each other with the boundary between groups interposed therebetween.

For this reason, as described above, the influence from the variation of the electric potential of the (n+1)th TFT due to the parasitic capacitance located between both transistors to the last thin film transistor in the nth TFT group can be suppressed. In other words, when the drain wiring line of the nth TFT and the drain wiring line of the (n+1)th TFT are adjacent to each other, since the (n+1)th TFT is connected to the first image signal line via the nth thin film transistor that is in a state of non-conduction during an "on" period, the variation of the electrical potential is not transmitted to the nth TFT. In addition, when the source wiring line of the nth TFT and the source wiring line of the (n+1)th TFT are adjacent to each other, both the source wiring line of the nth TFT and the source wiring line of the (n+1)th TFT are directly connected to the image signal lines and the electric potential thereof is stable. As a result, the influence from the variation of the electric potential on each other is minimal. Accordingly, the ghost image caused by the parasitic capacitance is not generated between the first data line and the nth data line in every group.

Therefore, according to the first driving circuit, the ghost image generated at the boundary between the simultaneously driven data line groups because of the parasitic capacitance located between the thin film transistors in the sampling circuit is reduced such that it is possible to display a high-definition image. Moreover, the pitch between the thin film transistors in the sampling circuit can be reduced while suppressing an adverse effect on the image display caused by the parasitic capacitance. As a result, it is possible to attain a narrow pitch between the data lines and to display a high-definition image.

According to a first aspect of the first driving circuit of the invention, the n thin film transistors in every group have the same arrangement except for one of the two adjacent thin film transistors. According to the first aspect of the first driving circuit of the invention, in the structure in which the source wiring line, the gate wiring line, and the drain wiring line have the same arrangement, one of the two adjacent thin film transistors with the boundary interposed therebetween is arranged such that the arrangement of the source wiring line, the gate wiring line, and the drain wiring line thereof is opposite to that of the other. As a result, the first driving circuit of the present invention can be obtained.

According to a second aspect of the first driving circuit of the invention, the n thin film transistors in every group have the same arrangement and the arrangements of the two adjacent groups are opposite to each other. According to the second aspect of the first driving circuit of the invention, in the structure in which the source wiring line, the gate wiring line, and the drain wiring line have the same arrangement, the arrangement in every group is alternately opposite to each other. As a result, the first driving circuit of the present invention can be obtained.

According to a third aspect of the first driving circuit of the invention, in the plurality of thin film transistors, arrangements of the source wiring line and drain wiring line with the gate interposed therebetween are alternately opposite to each other, and the n is an even number. According to the third aspect of the first driving circuit of the present invention, a serial to parallel conversion number (phase developing number), that is, n is an even number. In other words, for example, in every six, twelve, and twenty-four data line, the data lines are simultaneously driven. Here, since in the plurality of thin film transistors, arrangements of the source wiring line and drain wiring line with the gate interposed therebetween are alternately opposite to each other, the arrangement positioned at the boundary of each group is always same. In other words, at the boundary of each group, the source wiring lines are adjacent to each other or the drain wiring lines are adjacent to each other. Accordingly, the parasitic capacitance can be reduced at any boundary. For example, n is an odd number, and the source wiring lines on either side of the boundary between groups are adjacent to each other and the drain wiring lines on either side of the boundary between groups are adjacent to each other. By doing so, it is possible to prevent the parasitic capacitance from scattering.

At this time, when the source wiring lines are adjacent to each other at the boundary between transistor groups, any source wiring line is directly connected to the image signal line and the electric potential thereof is stable. As a result, the influence from the variation of the electric potential on each other is minimal. In contrast, when the drain wiring lines are adjacent to each other at the boundary between transistor groups, since the drain wiring line of the (n+1)th TFT is connected to the first image signal line via the thin film transistor that is in a state of non-conduction, the variation of the electrical potential is not transmitted to the nth TFT. Accordingly, in any case, a ghost image caused by the parasitic capacitance is not generated, which is advantageous.

An exemplary second driving circuit of an electro-optical device of the invention can include a plurality of scanning lines and a plurality of data lines arranged so as to cross each other in an image display region on a substrate, and a plurality of pixel portions connected to the plurality of scanning lines and the plurality of data lines, wherein on a peripheral area located on the periphery of the image display area on the substrate, n image signal lines are provided to which n (where n is a natural number equal to or greater than two) serial to parallel converted image signals are supplied. On the peripheral area of the image display area, a sampling circuit can include a plurality of thin film transistors and a data line are provided. The thin film transistor has (i) a drain connected to a drain wiring line arranged from the data line in a direction in which the data line extends, (ii) a source connected to a source wiring line arranged from the image signal line in a direction in which the data line extends, and (iii) a gate arranged to be sandwiched between the drain wiring line and the source wiring line in a direction in which the data line extends. The plurality of thin film transistors can be arranged to correspond to the plurality of data lines. The data line driving circuit supplies sampling circuit driving signals to the gate of the thin film transistor in every group of n thin film transistors that are connected to n simultaneously driven data lines among the plurality of data lines, in which a gap between two adjacent thin film transistors among the plurality of thin film transistors with the boundary between thin film transistor groups interposed therebetween is larger than a gap between two adjacent thin film transistors within a group.

According to the exemplary second driving circuit of the invention, the operation of the second driving circuit can be the same as that of the first driving circuit. In the second driving circuit, in particular, a gap between the two adjacent thin film transistors (that is, nth TFT and (n+1)th TFT) on either side of the boundary between groups comprising the n thin film transistors that simultaneously drive the n data lines can be larger than a gap between the thin film transistors adjacent to each other in the group. For this reason, as described above, because of the large gap, the influence from the variation of the electric potential of the (n+1)th TFT caused by the parasitic capacitance located between both transistors on the last thin film transistor in the nth TFT group can be suppressed. Accordingly, a ghost image caused by the parasitic capacitance is not generated between the first data line and the nth data line in every group.

Accordingly, according to the exemplary second driving circuit of the invention, it is possible to display a high-definition image in which the occurrence of ghost images is reduced. Moreover, except for the gap near the boundary, each gap between the thin film transistors in the group can be reduced. As a result, it is possible to attain a narrow pitch between the data lines, that is, a narrow pitch between the pixels, and to display a high-definition image.

According to a first aspect of the second driving circuit of the invention, in the gap between the two adjacent thin film transistors with the boundary interposed therebetween, some of the gate wiring lines connected to the gate are wired.

According to the first aspect of the second driving circuit of the invention, by effectively using a large gap in the boundary between groups, some of the gate wiring lines are wired in the gap. By doing so, the signals from a plurality of paths can be input to the gate wiring line. In addition, when the gate wiring line is formed to be long using a large gap, even if part of the gate wiring line is broken, it is possible to prevent the entire device from malfunctioning.

According to another exemplary aspect of the first or second driving circuit, the source wiring lines of the two adjacent thin film transistors are arranged adjacent to each other. According to this aspect, since the source wiring lines are adjacent to each other at the boundary between thin film transistor groups, any source wiring line can be directly connected to the image signal line and then the electric potential thereof becomes stable. As a result, the influence from the variation of the electric potential of the source lines on each other is minimal. Or, since each drain wiring line that has limited capacitance of the wiring line and is connected to a data line vulnerable to the influence from the variation of the electric potential is disposed inside each group, the variation from the electric potential of each drain wiring line may actually be small. Accordingly, a ghost image caused by the parasitic capacitance located between the first and nth data lines in each group may not be generated.

According to yet another aspect of the invention, the drain wiring lines of the two adjacent thin film transistors on either side of the boundary are arranged adjacent to each other. According to this aspect, since the drain wiring lines are adjacent to each other at the boundary between the groups, the drain wiring line of the (n+1)th TFT is connected to the first image signal line via the thin film transistor that is in a state of non-conduction, such that the variation from the electrical potential is not transmitted to the nth TFT. Accordingly, a ghost image caused by the parasitic capacitance located between the first and nth data lines in each group is not generated.

An exemplary third driving circuit of an electro-optical device of the invention can include a plurality of scanning lines and a plurality of data lines arranged so as to cross each other in an image display region on a substrate, and a plurality of pixel portions connected to the plurality of scanning lines and the plurality of data lines. On a peripheral area located on the periphery of the image display area on the substrate, n image signal lines can be provided to which n (where n is a natural number equal to or greater than two) serial to parallel converted image signals are supplied. On the peripheral area of the image display area, a sampling circuit including a plurality of thin film transistors and a data line driving circuit are provided. Each thin film transistor has (i) a drain connected to a drain wiring line arranged from the data line in a direction in which the data line extends, (ii) a source connected to a source wiring line arranged from the image signal line in a direction in which the data line extends, and (iii) a gate arranged to be sandwiched between the drain wiring line and the source wiring line in a direction in which the data line extends. The plurality of thin film transistors are arranged to correspond to the plurality of data lines. The data line driving circuit supplies sampling circuit driving signals to the gate of the thin film transistor in every group of n thin film transistors that are connected to n simultaneously driven data lines among the plurality of data lines, in which one of two thin film transistors adjacent to each other with a boundary between groups interposed therebetween among the plurality of thin film transistors is displaced in the direction in which the data line extends.

According to the exemplary third driving circuit of the invention, the operation of the third driving circuit is the same as that of the first driving circuit. In the third driving circuit, in particular, one of the two adjacent thin film transistors (that is, nth TFT and (n+1)th TFT) on either side of the boundary between groups comprising the n thin film transistors that simultaneously drive the n data lines is displaced in a direction in which the data lines extend, that is, a vertical direction or a Y direction. For this reason, as described above, because of the two dimensional distance as a shift amount, the influence from the variation of the electric potential of the (n+1)th TFT caused by the parasitic capacitance between both transistors on the last thin film transistor in the nth TFT group can be suppressed. Accordingly, a ghost image caused by the parasitic capacitance is not generated between the first data line and the nth data line in each group.

Therefore, according to the third driving circuit of the invention, it is possible to display a high-definition image in which the occurrence of ghost images is reduced. Moreover, one thin film transistor near the boundary is displaced in a direction in which the data line extends, and preferably, one thin film transistor near the boundary is displaced by a distance longer than the distance along the direction in which the data line of one thin film transistor extends such that a gap between the thin film transistors other than the one thin film transistor can be narrower. Accordingly, it is possible to attain a narrow pitch between the data lines, that is, a narrow pitch between the pixels, and then it is possible to display a high-definition image.

According to an aspect of the third driving circuit of the invention, one of the two thin film transistors is displaced by a length longer than the length of the plurality of thin film transistors along the direction in which the data line extends, and one of the source wiring line and the drain wiring line toward the outer direction of a thin transistor group in one of the two thin film transistors is displaced so as to be opposite to the other of the two thin film transistors. According to this aspect, one of the two adjacent thin film transistors on either side of the boundary between thin film transistor groups is displaced by a length longer than the length of the plurality of thin film transistors along the direction in which the data line extends. Accordingly, the distance between the source wiring line and the drain wiring line adjacent to each other on either side of the boundary between groups can be increased. Moreover, the source wiring line or the drain wiring line toward the outer direction of a thin film transistor group in one of the two thin film transistors is displaced so as to be opposite to the other of the two thin film transistors. For example, when the wiring line toward the outer direction of a thin film transistor group in one of the two thin film transistors is the source wiring line toward the thin film transistor from the periphery of a substrate, the one thin film transistor is displaced toward the periphery of the substrate along the direction in which the data line extends. On the contrary, when the wiring line toward the outer direction of a thin film transistor group in one of the two thin film transistors is the drain wiring line toward the thin film transistor from the image display region, the one thin film transistor is displaced toward the image display region along the direction in which the data line extends.

In any case, the source wiring line or the drain wiring line toward the outer direction of a thin film transistor group in one of the two adjacent thin film transistors is terminated at a position (that is, positions opposite to each other) surrounded by the source wiring line and the drain wiring line toward the outer direction of the group in the other of the two adjacent thin film transistors adjacent to each other. Accordingly, between the source wiring line and the drain wiring line toward the outer direction of the group in one of the two thin film transistors and the source wiring line and the drain wiring line toward the outer direction of the group in the other of the two thin film transistors adjacent to each other, the parasitic capacitance can be significantly reduced.

In addition, according to the aspect, since the two thin film transistors are displaced by a length longer than the length of the thin film transistor along the direction in which the data line extends, the parasitic capacitance reduction effect is relatively large. However, although the shift amount is small, a corresponding effect can be obtained. In other words, when the thin film transistor is displaced along the direction in which the data line extends, a parasitic capacitance reduction effect can be obtained in accordance with the shift amount.

An exemplary electro-optical device of the invention can have the above-mentioned first to third driving circuits of the invention (including various aspects thereof), the substrate, the scanning lines, the data lines, the plurality of pixel portions, and the image signal line. According to the electro-optical device of the invention, by including the above-mentioned first to third driving circuits, it is possible to display a high-definition image in which the occurrence of ghost images is reduced and it is possible to display a high-definition image. The electro-optical device of the invention is applied to a liquid crystal device, an electrophoresis device such as electronic paper, and a display device using an electron-emitting element (filed emission display and surface-conduction electron-emitter display).

In order to solve the above-mentioned problems, an electronic apparatus of the invention can include the above-mentioned electro-optical device of the invention.

Since the electronic apparatus of the invention can include the above-mentioned electro-optical device of the invention, the electronic apparatus of the invention can be applied to various electronic apparatuses, such as a projection-type display device, a television receiver, a cellular phone, an electronic pocketbook, a word processor, a view-finder-type or a monitor-direct-view-type video tape recorder, a workstation, a videophone, a POS terminal, and a touch panel that can display high-definition images.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Embodiments of the invention will be now described with reference to the accompanying drawings. In embodiments described below, an electro-optical device of the invention can be applied to a liquid crystal device.

First, a liquid crystal device of a first exemplary embodiment according to an electro-optical device of the invention will be described with reference to FIGS. 1 to 9.

Figure 1:
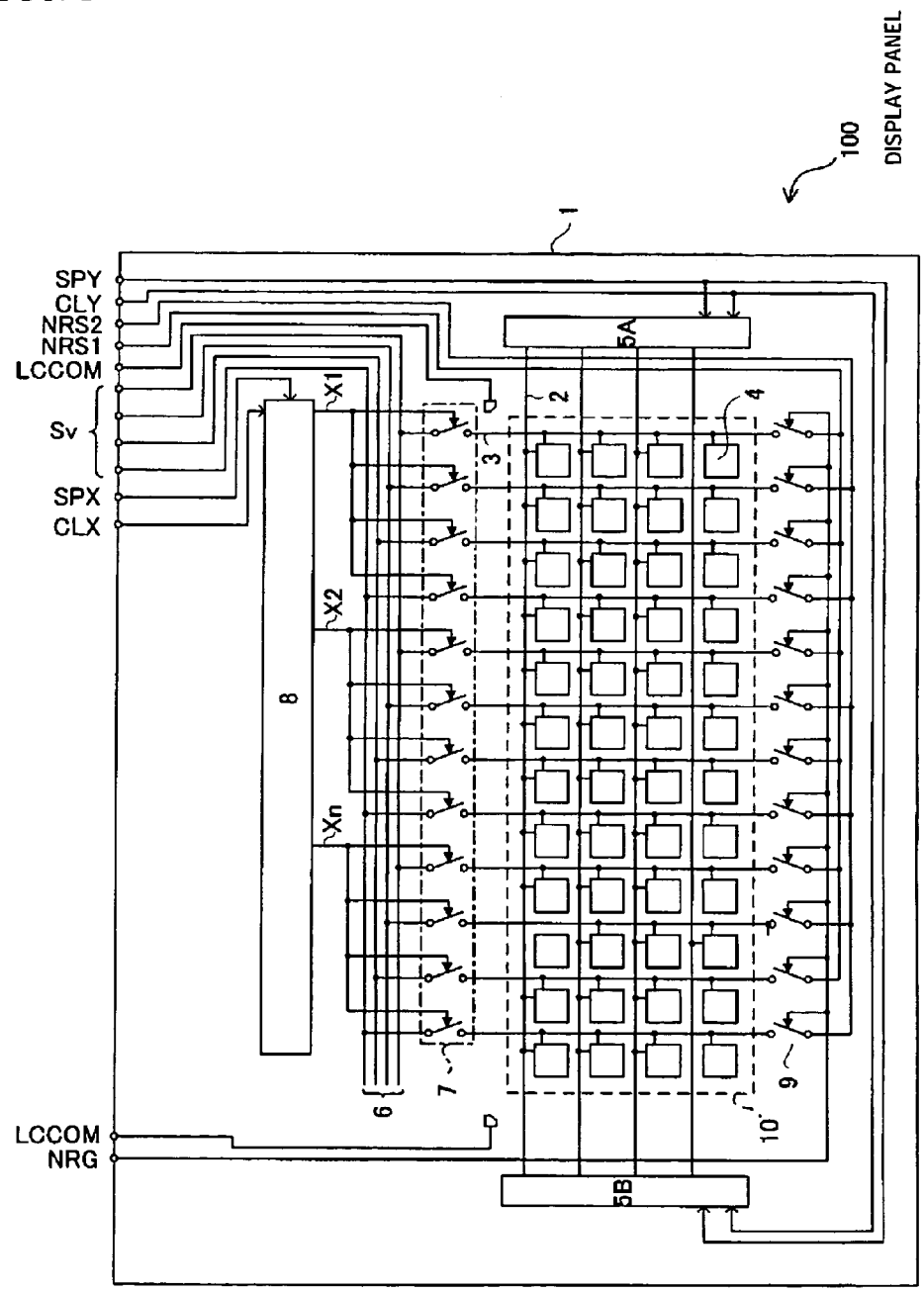
FIG. 1 is an exemplary block diagram illustrating a display panel of an electro-optical device according to a first exemplary embodiment of the invention.

FIG. 1 shows the configuration of a display panel in the liquid crystal device according to the embodiment. The liquid crystal device can include a built-in driving circuit type display panel 100 and a circuit unit for performing overall driving control or various processes on image signals (not shown).

In the display panel 100, a TFT array substrate 1 and a counter substrate (not shown) are arranged opposite to each other with a liquid crystal layer interposed therebetween. In every pixel portion 4 of an image display region 10 dividedly disposed, an electric field is applied to the liquid crystal layer, such that the amount of light transmission of the counter substrate is controlled and grayscale image display is performed. In addition, the liquid crystal device adopts TFT active matrix driving. In the pixel display region 10 of the TFT array substrate 1 in the display panel 100, a plurality of scanning lines 2 and a plurality of data lines 3 are arranged to cross each other, and the pixel portions 4 are connected to the respective scanning lines 2 and data lines 3. Each pixel portion 4 can include a pixel switching TFT for selectively applying an image signal voltage supplied by the data line 3 and a pixel electrode that constitutes a liquid crystal storage capacitance together with a counter electrode to apply an input voltage to the liquid crystal layer and to maintain the input voltage.

The two ends of the scanning line 2 are connected to scanning line driving circuits 5A and 5B which sequentially and selectively drive the scanning line 2. The scanning line driving circuits 5A and 5B are arranged on a peripheral region of the image display region 10 and simultaneously apply a voltage to both ends of each scanning line 2.

The data lines 3 are image signal lines 6 for supplying image signals Sv via a sampling circuit 7. The sampling circuit 7 is can include switching elements installed in every data line 3 so as to select the data lines 3 receiving the image signals Sv from the image signal lines 6. The switching operation is controlled in a timing manner by the data line driving circuit 8. Further, a precharge circuit 9 is provided to apply a precharge level to the data lines 3, before application of the image signals Sv.

Herein, the display panel 100 is driven using serial to parallel conversion. In other words, as illustrated in the drawing, a plurality of image signal lines 6 (here, four) is arranged, and the data lines 3 (that is, four) sequentially connected to the respective image signal lines constitute a group, and the switching elements corresponding to the data lines 3 are connected to the data line driving circuit 8 via control wiring lines X (X1, X2, . . . , Xn) in every group. In addition, the sampling circuit 7 sequentially receives, as sampling circuit driving signals, pulses sequentially output from a shift register provided in the data line driving circuit 8 via the control wiring lines X1, X2, . . . , Xn. At this time, a plurality of switching elements that forms a group connected to the same control wiring line X is simultaneously driven. As a result, the image signals on the image signal lines 6 are sampled in every group of the data lines 3. As such, when the plurality of image signal lines 6 is simultaneously supplied with parallel image signals obtained by converting serial image signals, since the input of the image signals to the data lines 3 is simultaneously performed in every group, it is possible to reduce the driving frequency.

Figure 2:
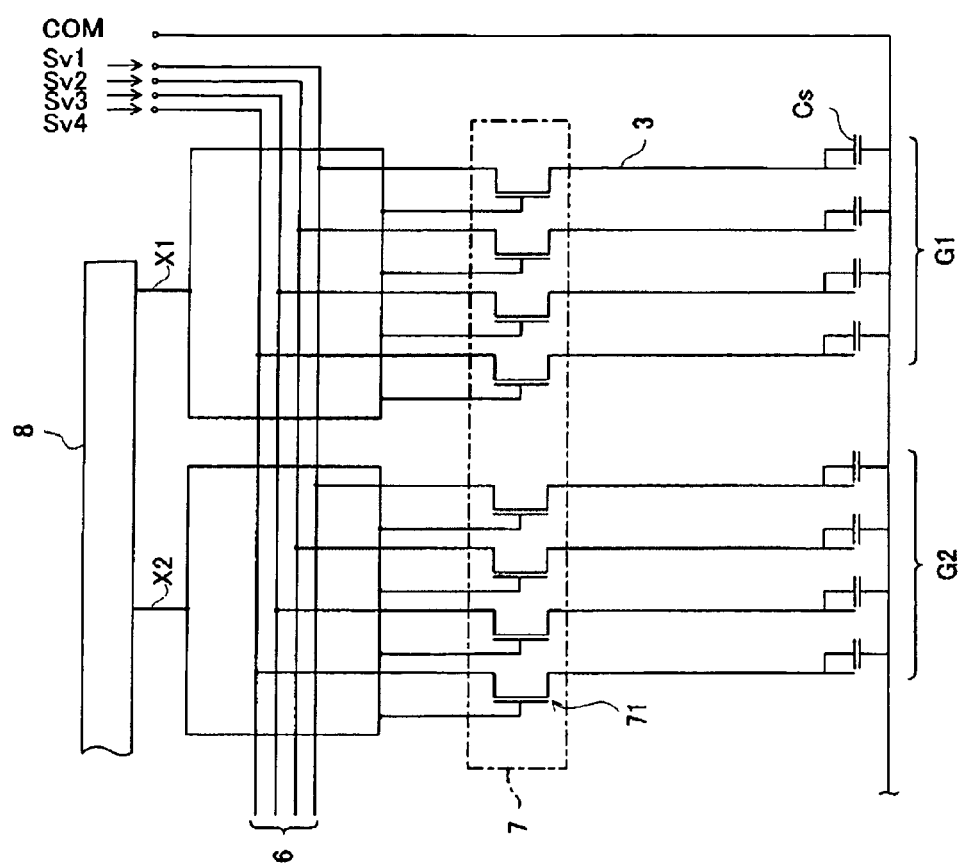
FIG. 2 is an exemplary circuit diagram illustrating the configuration of a data line driving circuit system in the display panel illustrated in FIG. 1.

FIG. 2 is an exemplary circuit diagram showing the configuration of a data line driving circuit system in the display panel. In addition, for convenience, FIG. 2 shows only the data line 3 systems of the groups G1 and G2 that are connected to the control wiring lines X1 and X2. In the description below, the exemplary embodiment will be described in detail based on the circuit systems of the two groups.

Herein, the number of the image signal lines 6 is four, and they are supplied with image signals Sv1 to Sv4. In addition, the switching elements of the sampling circuit 7 are specifically made of sampling TFTs 71. In each of the sampling TFTs 71, the data lines are connected in series to the source and drain of the TFT 71. The gate of the TFT 71 is connected to the data line driving circuit 8. In addition, each of the data lines 3 is connected to a plurality of pixel portions 4 arranged opposite to the sampling circuit 7 and supplies a signal voltage to a liquid crystal capacitance Cs of the selected pixel portion 4. Further, a storage capacitance may be separately connected parallel to the liquid crystal capacitance Cs.

Next, the layout of the sampling circuit on a TFT array substrate will be described with reference to FIGS. 3 and 4.

In the sampling circuit 7 of the present embodiment, among the sampling TFTs 71 parallel to each other, the two sampling TFTs 71 adjacent to each other on either side of a boundary between the groups are disposed such that the source and drain wiring lines thereof are arranged opposite to each other.

Figure 3:
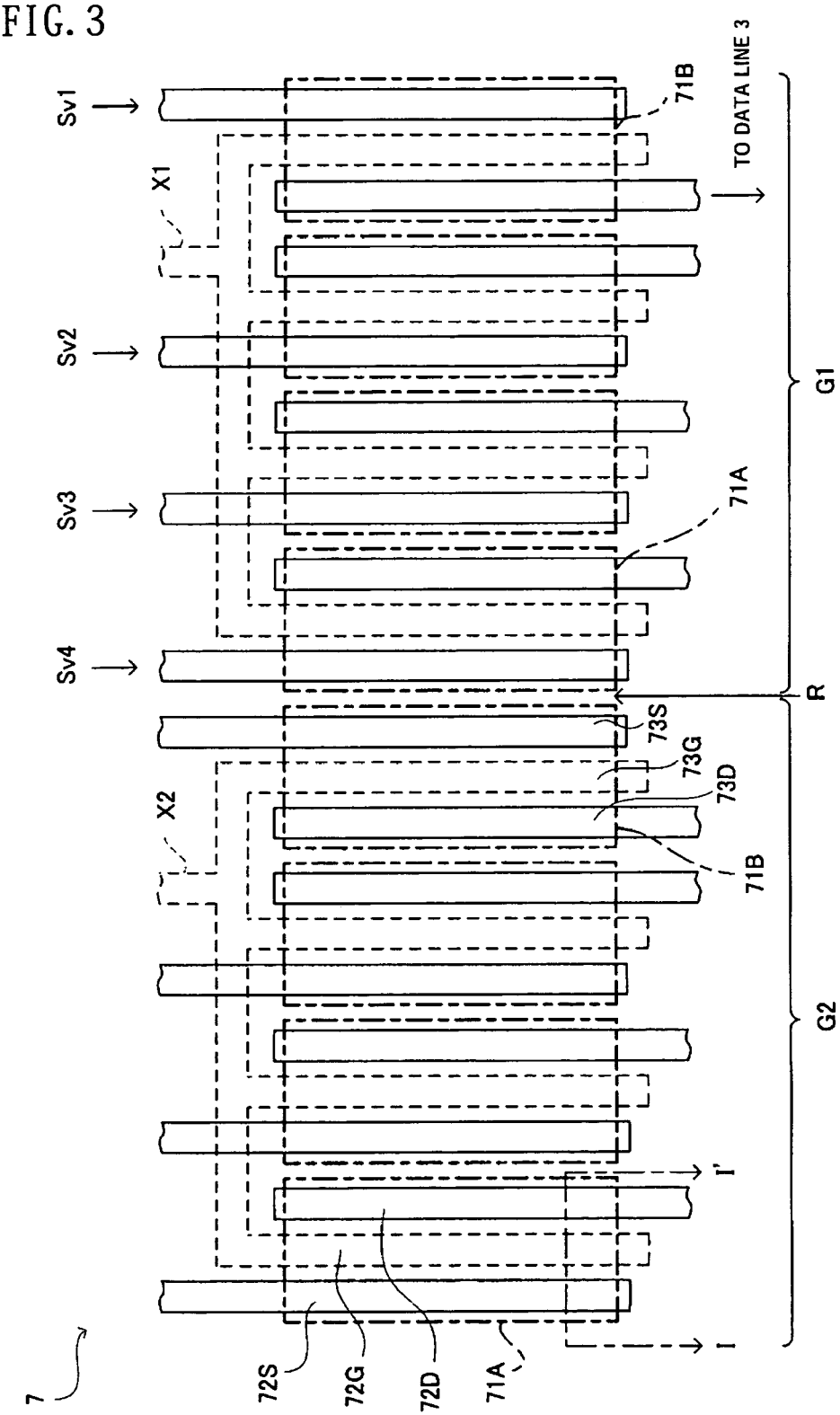
FIG. 3 is a layout diagram of wiring lines of a sampling circuit illustrated in FIG. 2.

In detail, the sampling TFTs 71 can be arranged in a layout illustrated in FIG. 3. The plurality of sampling TFTs 71 is grouped in the groups G1 and G2 corresponding to the control wiring lines X1 and X2. Each of the groups G1 and G2 has four sampling TFTs 71 having a sampling TFT 71A (the left end of each group in FIG. 3) and a sampling TFT 71B (the right end of each group in FIG. 3). Each of the sampling TFTs 71A can include a source wiring line 72S and a drain wiring line 72D provided in a direction in which the data line 3 extends and a gate wiring line 72G which is provided between the source wiring line 72S and the drain wiring line 72D in the direction in which the data line 3 extends. In addition, each of the sampling TFTs 71B can include a source wiring line 73S and a drain wiring line 73D provided in a direction in which the data line 3 extends and a gate wiring line 73G which is provided between the source wiring line 73S and the drain wiring line 73D in the direction in which the data line 3 extends.

Figure 4:
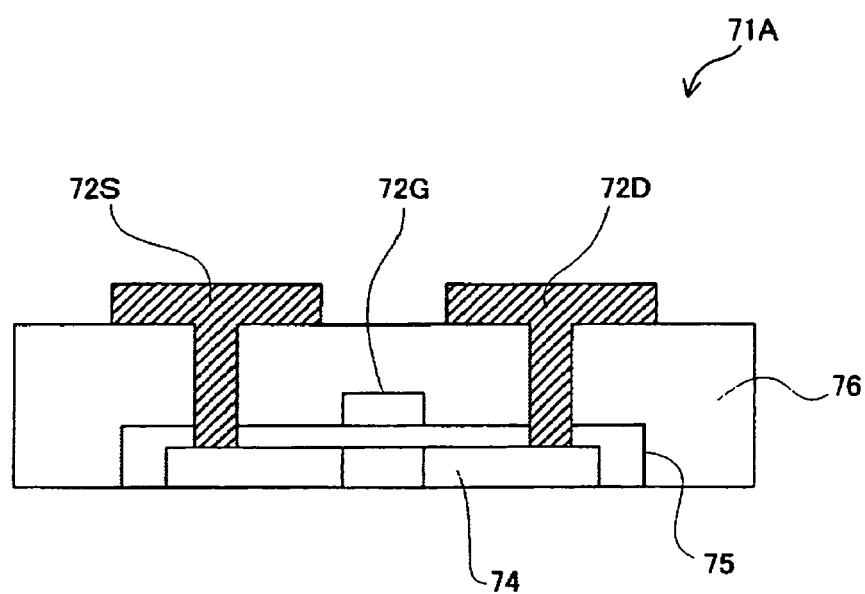
FIG. 4 is a cross-sectional view taken along the line I-I' of FIG. 3.

Furthermore, FIG. 4 is a magnified view showing a sectional configuration of the TFT 71A taken along the line I-I' of FIG. 3. For example, in the sampling TFT 71A, the source wiring line 72S and the drain wiring line 72D are respectively connected to a source region 74S and a drain region 74D of a semiconductor layer 74 provided on the TFT array substrate 1, and the gate wiring line 72G is provided on an upper layer of a channel region 74C such that the channel region 74C and the gate wiring line 72G face each other with a gate insulating film 75 therebetween. The source wiring line 72S, the gate wiring line 72G, and the drain wiring line 72D are electrically insulated to each other by an interlayer insulating film 76. In addition, the sampling TFT 71B also has the configuration illustrated in FIG. 4.

As illustrated in FIG. 3, the sampling TFT 71 has two types of TFT, including the TFT 71A and the TFT 71B having a symmetrical configuration with the gate region interposed therebetween, and the source wiring line 72S and the drain wiring line 72D are arranged with an arrangement opposite to that of the source wiring line 73S and the drain wiring line 73D. Here, in the sampling TFT 71, the TFT 71A and the TFT 71B are arranged so as to be adjacent to each other on either side of the boundary R between the groups. Further, in each group, when excluding the TFT 71B arranged at one uppermost end of the group, only the TFTs 71A can constitute the group and thus all of the source wiring lines and drain wiring lines are arranged with the same arrangement as each other.

In the display panel 100 described above, when supplying image signals Sv to each of the data lines 3 during a horizontal scanning period, the data line driving circuit 8 sequentially inputs control signals to the control wiring lines X1, X2, . . . , Xn at a predetermined timing, such that the on/off states of the sampling TFTs 71 are controlled in every group. The sampling TFTs 71 of each group are turned on in synchronization with the sampling control, the image signals Sv1 to Sv4 corresponding to each data line 3 of the group in which a signal is permitted to input are sampled on the image signal line 6, and the sampled signal is simultaneously supplied to four corresponding data lines 3.

A voltage is applied to the control wiring line X1 and the group G1 is supplied with the image signals Sv1 to Sv4 (refer to FIGS. 2 and 3). In this case, only the sampling TFTs 71 of the group G1 are turned on and all of the sampling TFTs 71 other than the sampling TFTs 71 of the group G1 are turn off. Accordingly, a voltage corresponding to the input image signals Sv (Sv1 to Sv4) is applied to the source wiring lines 72S and 73S and the drain wiring lines 72D and 73D of the sampling TFTs 71 of the group G1.

At this time, the sampling TFTs 71 adjacent to each other are arranged opposite to each other with the interlayer insulating film 76, serving as a dielectric film, interposed therebetween, such that a parasitic capacitance exists between wiring line portions serving as capacitance electrodes. In particular, the parasitic capacitance is large between the most adjacent wiring lines. In addition, due to the high definition, the pixel pitch becomes narrower and the spacing between the sampling TFTs 71 becomes narrower, such that the dielectric film becomes thinner. As a result, the parasitic capacitance increases. During operation, in the group G1, the effects of electric potential variation on each other is caused between the source wiring line 72S and the drain wiring line 72D adjacent to each other, depending on the magnitude of the parasitic capacitance in the wiring line system. Accordingly, in the data line 3 and the pixel portion 4, the variation of the electric potential is caused by image signals other than the originally supplied image signals. The variation of the electric potential may cause a ghost image.

A parasitic capacitance (hereinafter, referred to as capacitance between groups) between the sampling TFTs 71 which belong to different groups from each other and which are adjacent to a boundary between the groups can have a large effect on the image quality as compared to a parasitic capacitance between the sampling TFTs 71 within a group.

Figure 5:
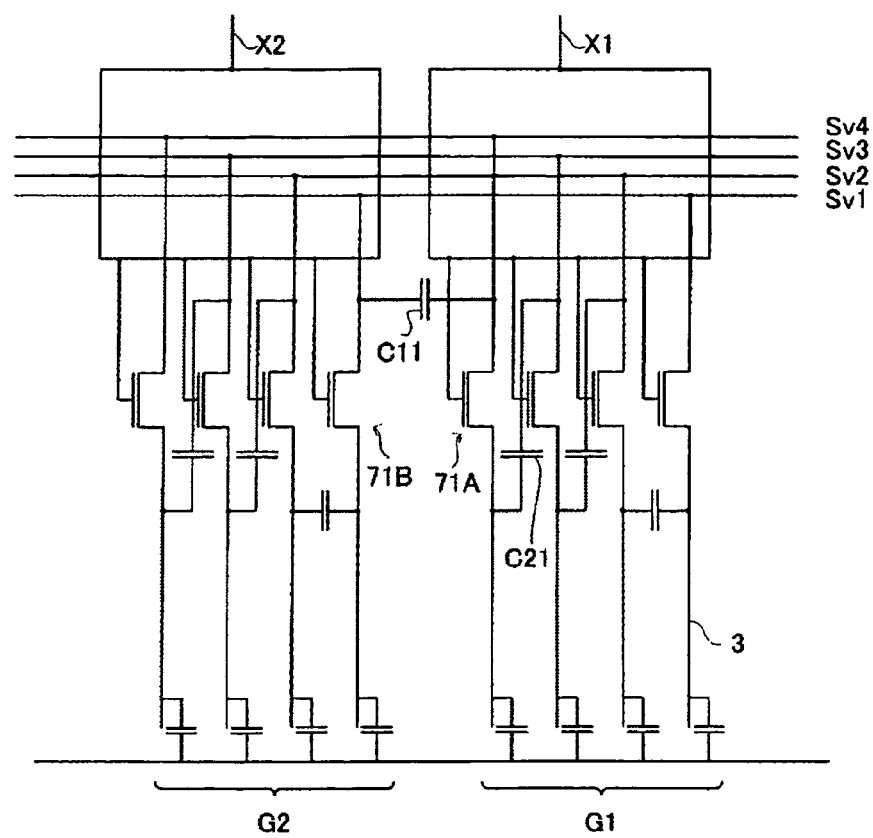
FIG. 5 is a view illustrating a parasitic capacitance in the sampling circuit illustrated in FIG. 2.
Figure 6:
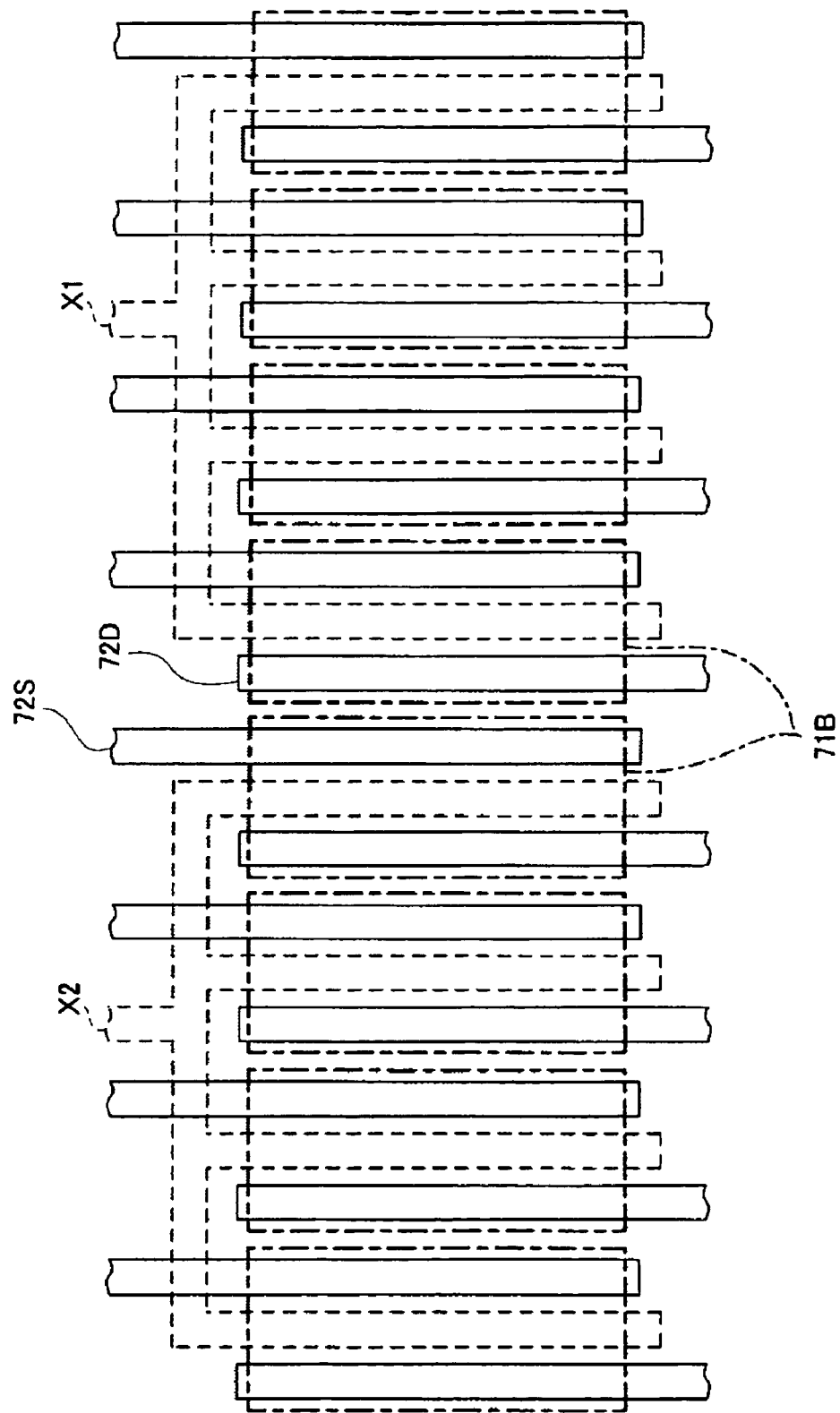
FIG. 6 is a layout diagram of wiring lines illustrating a comparative example of the sampling circuit illustrated in FIG. 3.
Figure 7:
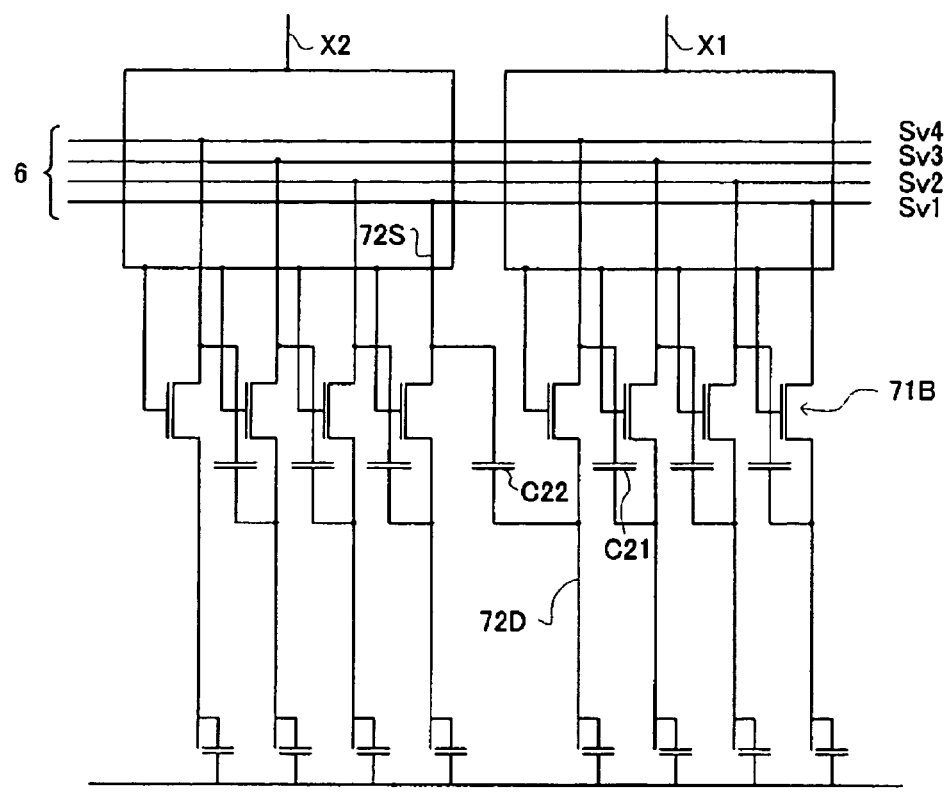
FIG. 7 is a view illustrating a parasitic capacitance in the sampling circuit illustrated in FIG. 6.

In this respect, a description thereof will be made with reference to FIGS. 5 to 7. FIG. 5 is an equivalent circuit diagram showing an aspect of the parasitic capacitance in the sampling circuit according to the present embodiment. FIGS. 6 and 7 are equivalent circuit diagrams showing an aspect of the parasitic capacitance in the sampling circuit according to a comparative example.

As illustrated in FIG. 5, according to the exemplary embodiment, in the group G1 or the group G2, a parasitic capacitance C21 is formed between a source wiring line 72S of a TFT 71A and a drain wiring line 72D of the TFT 71A adjacent to the source wiring line 72S with a boundary R not interposed therebetween. On the other hand, between the group G1 and the group G2, a parasitic capacitance C11 between groups is formed between a source wiring line 73S of a TFT 71B of the group G2 and a source wiring line 72S of the TFT 71A adjacent to the source wiring line 73S with the boundary R interposed therebetween. In this case, the capacitance C11 between groups is a parasitic capacitance arranged such that the source wiring lines are opposite to each other.

In this regard, FIG. 6 illustrates a comparative example in which arrangements of the source wiring lines and drain wiring lines are equal to each other in all of the sampling TFTs, that is, all of the TFTs 71A. According to the comparative example, as illustrated in FIGS. 6 and 7, regardless of whether it is in the group or between the groups, a parasitic capacitance C21 is formed between a source wiring line 72S of a TFT 71A and a drain wiring line 72D of the TFT 71A adjacent to the source wiring line 72S. In other words, the parasitic capacitance C21 between groups is formed, with a boundary R interposed therebetween. In this case, the capacitance C21 between groups is a parasitic capacitance in which the source wiring line and drain wiring line thereof are arranged opposite to each other.

In common, the image does not change rapidly from pixel unit to pixel unit, and the pixels adjacent to each other have similar displays. In other words, the more adjacent to each other the pixels are, the smaller the difference of the image signal voltage between the pixels gets. Accordingly, in the groups according to the exemplary embodiment and the comparative example, an adverse effect due to the variation of the electric potential between the adjacent wiring lines caused by the parasitic capacitance C21 is small. In contrast, when the image changes rapidly from pixel unit to pixel unit and a rapid change between the pixels adjacent to each other occurs, although a ghost image is generated between the pixel lines connected to the data lines adjacent to each other by the parasitic capacitance disposed between the sampling TFTs 71 adjacent to each other, it is difficult to see the ghost. For example, even when a black line and a white line are displayed at the boundary between a white image and a black image, it is impossible for a user to see only one line, for example, the black line or the white line, which is thin and separated by several tens of micrometers.

However, according to the comparative example, in a period for which the image signal should be supplied to the group G1, in one boundary R of the group G1, the variation of the electric potential in the source wiring line 72S directly connected to the image signal line 6 is transmitted to the adjacent drain wiring line 72D without going via the channel region in a state where all of the TFTs are turned off, through the capacitance C22 between the groups. Or, in a period for which the image signal should be supplied to the group G1, in the other boundary R of the group G1, the variation of the electric potential in the source wiring line 72S directly connected to the image signal line 6 is transmitted to the drain wiring line 72D to which the image signal is supplied from the image signal line 6, through the capacitance C22 between the groups. As a specific example of this case, according to the inventor of the present invention, when the image signal Sv1 is supplied for performing a black display of the pixel portion 4 located on the right end of the group G1, it is observed that the pixel portion 4 located on the left side of the group G1 performs a white display. This is because the parasitic capacitance C22 effectively decreases the voltage applied to the pixel portion 4 at the left end in accordance with the image signal Sv1.

In addition, by using the capacitance C22 between the groups, the electric potential of the data line 3 arranged at one side of the group acts on the electric potential of the data line 3 arranged at the other side of the group, such that the influence is applied to the pixels at a distance equal to the spacing between groups. Accordingly, it is easy to view the influence compared to a noise generated between the pixels adjacent to each other. According to the comparative examples illustrated in FIGS. 6 and 7, the adverse effect due to the capacitance C22 between groups may be visualized as a ghost image with the pixels separated from each other on the display screen.

On the contrary, in the exemplary embodiment, the layout of the sampling TFT 71 is designed such that the source wiring line 72S other than the drain wiring line 73D at the group G1 side is arranged to be adjacent to the source wiring line 73S at the group G2 side, at the boundary R of the group. Here, since both ends of the capacitor C11 between groups are directly connected to the image signal lines 6, the capacitor C11 between groups is a parasitic capacitance in which the source wiring lines having a very stable electric potential are arranged opposite to each other. Moreover, even when the influence due to the variation of the electric potential is generated, the gate of the sampling TFT exists, such that the data line 3 is not affected.

As such, according to the embodiment illustrated in FIG. 5, the variation of the voltage of the data line 3 and the pixel portion 4 caused, for example, by the capacitance C22 between groups, as in the comparative example, is reduced, and therefore, the image display can be performed without the deterioration of the image quality due to the occurrence of ghost images. In addition, a part of the conventional sampling circuit is subjected to a change of the layout, such that a large amount of parasitic capacitance component referred to as the capacitance between groups is reduced, thereby improving the image quality.

Moreover, the component of the parasitic capacitance having a large influence on the image quality is reduced, such that the wiring line pitch of the sampling TFT 71, which is in a trade-off relation together with the parasitic capacitance, can be reduced (without deteriorating the image quality). Accordingly, it is possible to attain high definition of the display panel 100 as compared to the related art.

Figure 8:
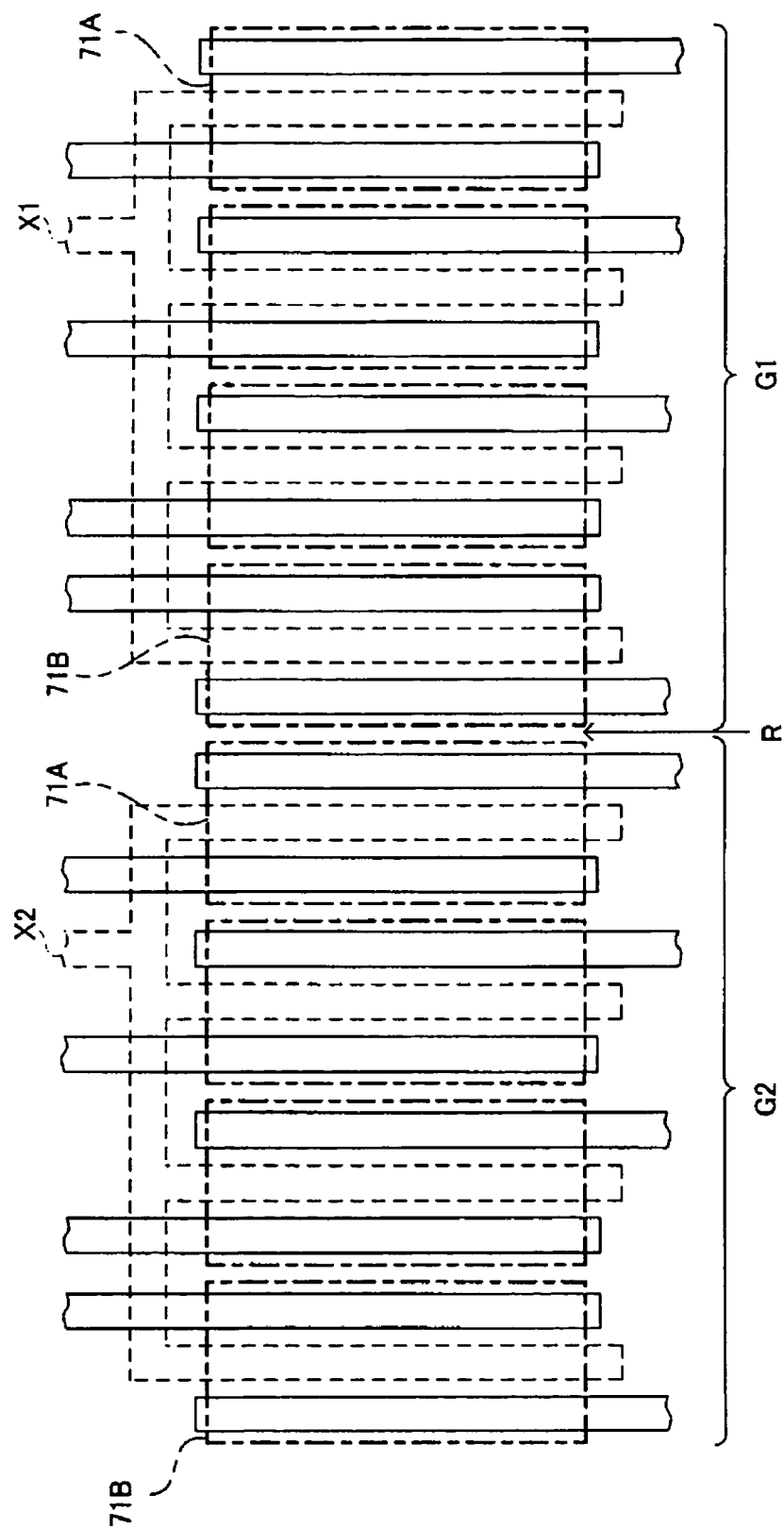
FIG. 8 is a layout diagram of wiring lines illustrating a modification of the sampling circuit according to the first embodiment of the present invention.

FIG. 8 illustrates a first modification of the sampling circuit in the first exemplary embodiment. In the first exemplary embodiment, the source wiring lines of the sampling TFTs 71 in each group are arranged adjacent to each other with the boundary R interposed therebetween. However, in the present modification, the drain wiring lines of the sampling TFTs 71 in each group are arranged adjacent to each other with the boundary R interposed therebetween. For example, according to the modification illustrated in FIG. 8, each group of the sampling TFTs 71 is constituted using only the TFTs 71A, except that the TFT 71B is arranged at the left end of each group. In addition, the TFT 71A is arranged at the left end and the TFT 71B is arranged at the right end, with the boundary R interposed therebetween (in the first embodiment, the TFT 71B is arranged at the right end of the group and the TFT 71B is arranged at the left end and the TFT 71A is arranged at the right end with the boundary R interposed therebetween).

According to this layout arrangement, the capacitance between groups is reduced, and thus it is possible to display a high-definition image in which ghost images are suppressed. In addition, without deteriorating the image quality, as the pitch of the sampling TFT 71 becomes smaller, it is possible to display a high-definition image.

Figure 9:
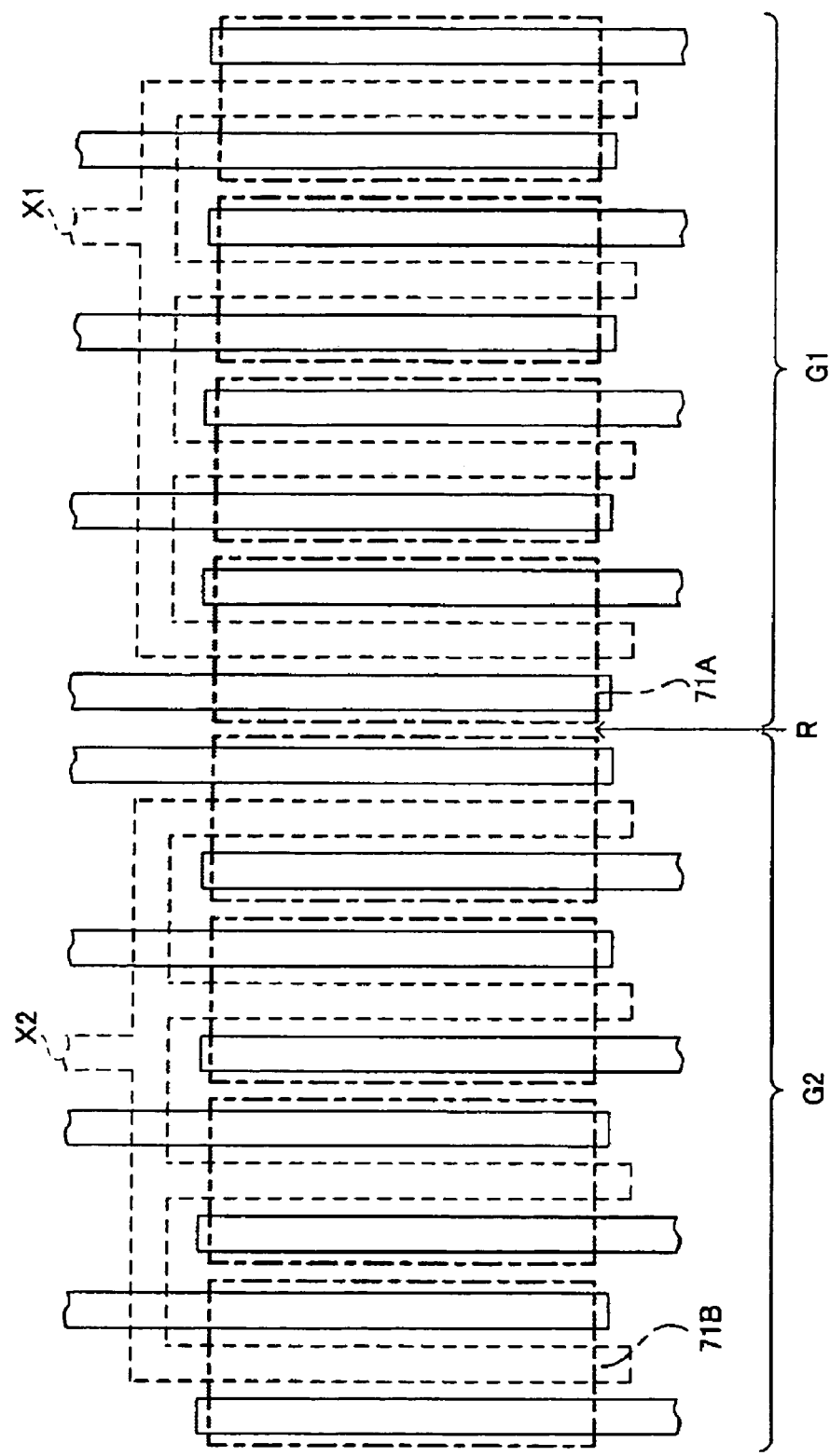
FIG. 9 is a layout diagram of wiring lines illustrating a modification of the sampling circuit according to the first embodiment of the present invention.

FIG. 9 illustrates a second modification of the sampling circuit in the first embodiment. In the first embodiment and first modification, each group of the sampling TFTs 71 is constituted using only the TFTs 71A, except that the TFT 71B is arranged at one end of each group. However, in the second modification, the sampling TFTs 71 are arranged such that the arrangements of the wiring lines are alternately opposite to each other between the groups. For example, in FIG. 9, the TFT 71A is arranged in the group G1 and the TFT 71B is arranged in the group G2. In this case, the source wiring lines of the sampling TFTs 71 in each group are arranged adjacent to each other with the boundary R interposed therebetween. As a result, the same effect as the first embodiment can be obtained.

Next, a second exemplary embodiment will be described with reference to FIGS. 10 and 11. The main configuration of an electro-optical device according to the second exemplary embodiment is the same as the first exemplary embodiment except for the layout of a sampling circuit. Accordingly, the same constituent elements as the first embodiment are denoted by the same reference numerals and the description thereof will be omitted.

Figure 10:
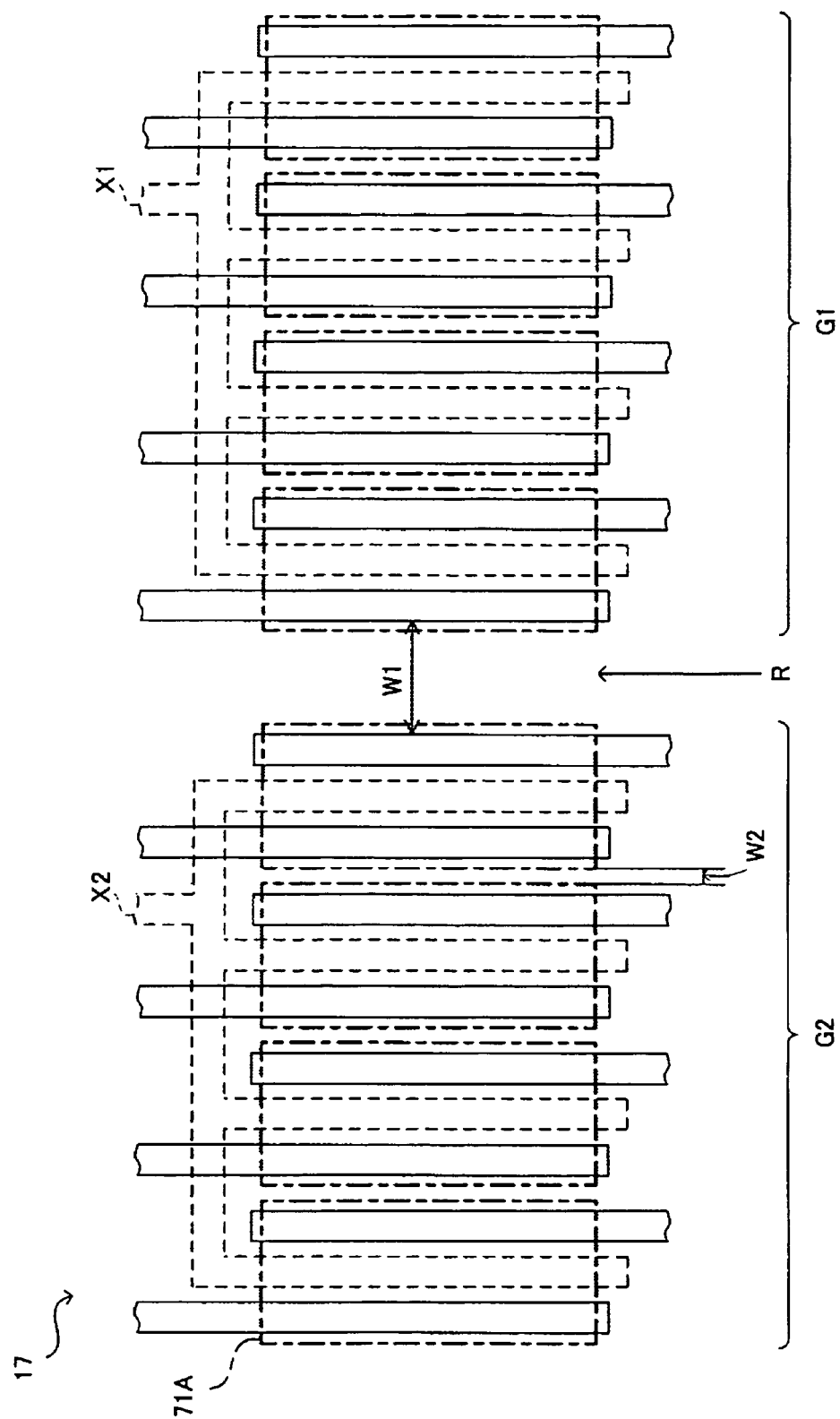
FIG. 10 is a layout diagram of wiring lines of a sampling circuit applied to an electro-optical device according to a second embodiment of the present invention.

FIG. 10 illustrates the configuration of the sampling circuit according to the second embodiment. In the sampling circuit 17, TFTs (here, TFTs 71A) having the same structure are arranged parallel to each other. A gap W1 between the TFTs 71A adjacent to each other with a boundary R of the groups interposed therebetween is larger than a gap W2 between the TFTs 71A adjacent to each other in the groups.

In this case, the capacitance between groups (FIG. 7: capacitance C22) is reduced by the gap W1. Accordingly, the variation of the voltage of the data line 3 and the pixel portion 4 caused by the capacitance C22 between groups is reduced such that the image display can be performed without deteriorating the image quality due to the ghost images.

Moreover, the component of the parasitic capacitance having a large influence on the image quality is reduced, such that the wiring line pitch of the sampling TFT 71, which is in a trade-off relation together with the parasitic capacitance, can be reduced (without deteriorating the image quality). Accordingly, it is possible to attain a high definition display panel 100 as compared to the conventional art.

Figure 11:
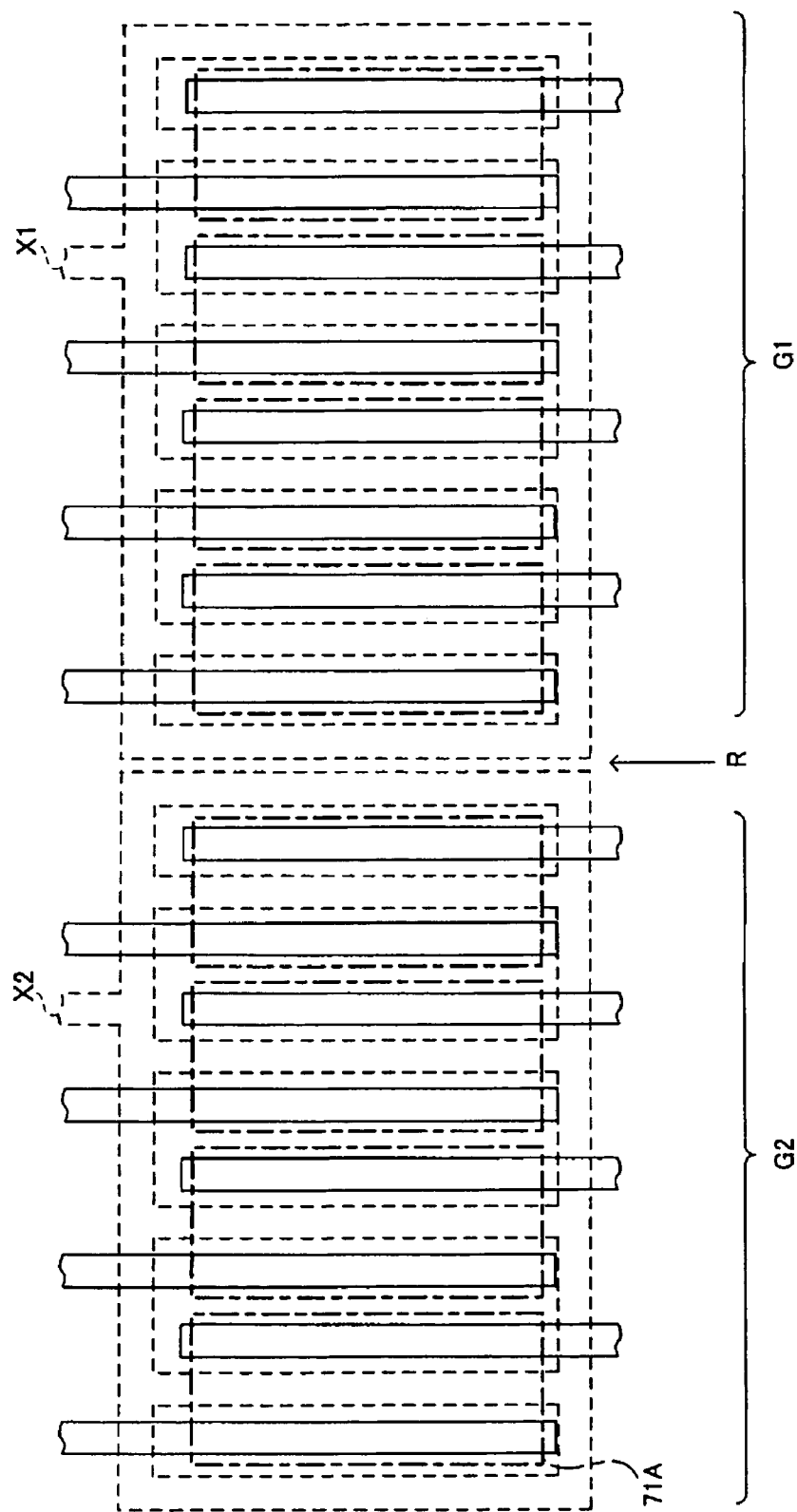
FIG. 11 is a layout diagram of wiring lines showing an application example of the sampling circuit according to the second embodiment of the present invention.

FIG. 11 illustrates an application of the sampling circuit in the second embodiment. In the present application, a part of a gate wiring line 72G connected to the gate is provided in a gap W1 between TFTs 71A adjacent to each other with a boundary R interposed therebetween. In other words, the gate wiring lines 72G are commonly connected to the control wiring lines X1, X2, . . . , Xn in every group and also the common portion of the gate wiring lines 72G are arrayed along a periphery of each group of TFTs 71A. By doing so, each gate wiring line 72G is supplied with a sampling circuit driving signal from both the left and right sides of the group. In this manner, when the gate wiring lines 72G are formed to be long, even if the part of the gate wiring lines 72G are broken, it is possible to drive the TFTs 71A normally.

In the wiring line structure described above, by wiring the part of the gate wiring lines 72G using the gap W1, it is possible to implement a wiring line layout that does not cause waste.

Furthermore, in the sampling circuit according to the second exemplary embodiment and an application, the modification may be made such that the source wiring lines and drain wiring lines of the sampling TFTs 71 with the boundary R interposed therebetween are arranged to be adjacent to each other, as in the first exemplary embodiment and the modification thereof. In this case, the capacitance between groups can be further reduced.

Next, a third exemplary embodiment will be described with reference to FIGS. 12 and 13. The main configuration of an electro-optical device according to the third embodiment is the same as in the first exemplary embodiment except for the layout of a sampling circuit. Accordingly, the same constituent elements as the first exemplary embodiment are denoted by the same reference numerals and the description thereof will be omitted.

Figure 12:
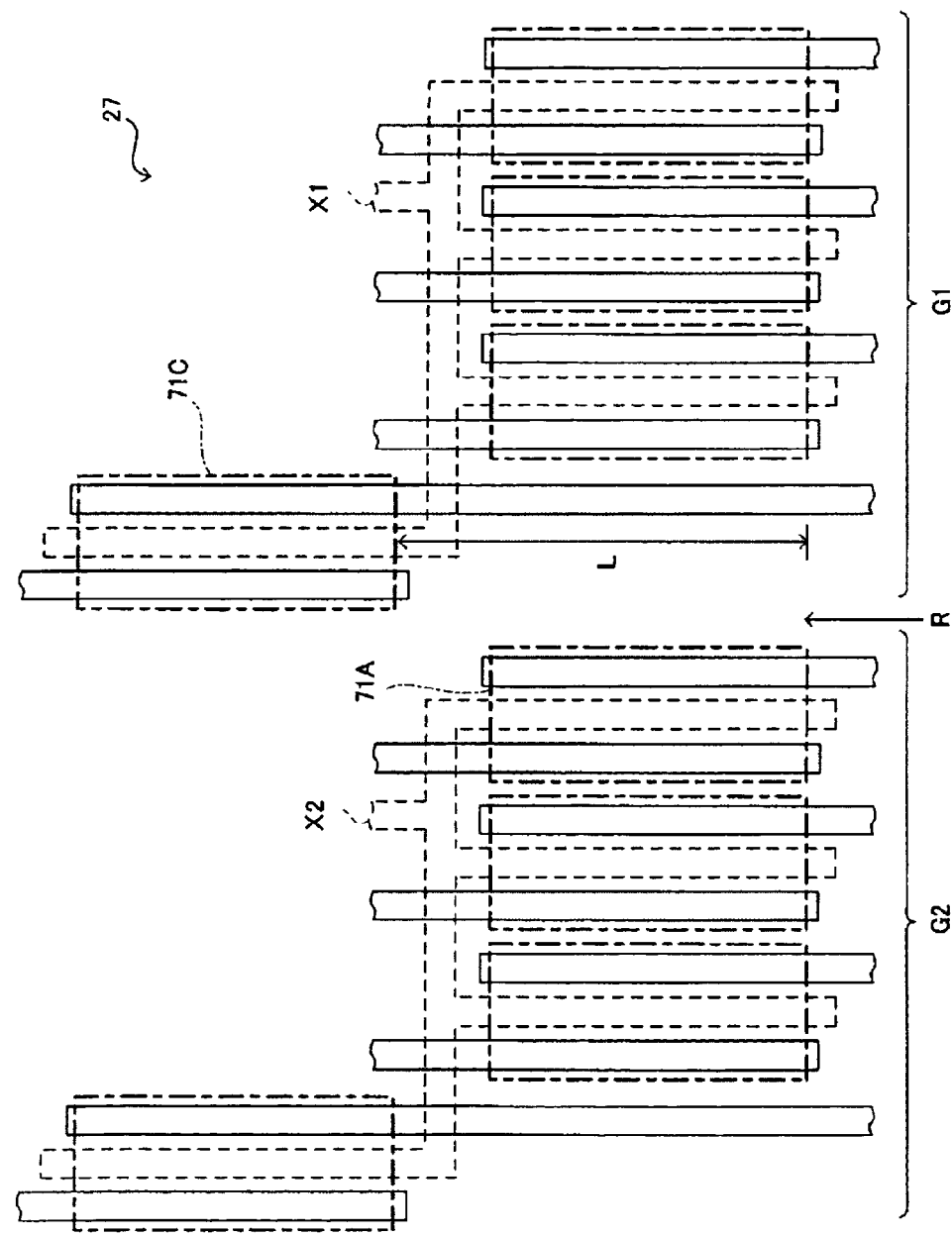
FIG. 12 is a layout diagram of wiring lines of a sampling circuit applied to an electro-optical device according to a third embodiment of the present invention.

FIG. 12 illustrates the configuration of the sampling circuit according to the third embodiment. In the sampling circuit 27, TFTs (here, TFTs 71A) having the same structure are arranged parallel to each other. However, only a TFT 71C that is one of the sampling TFTs 71 adjacent to each other with the boundary R of the group interposed therebetween is displaced by a distance L in the direction in which the data line 3 extends.

In this case, the capacitance between groups (FIG. 7: capacitance C22) is reduced according to the distance L, the shift amount of the TFT 71C. Accordingly, the variation of the voltage of the data line 3 and the pixel portion 4 caused by the capacitance C22 between groups is reduced, such that the image display can be performed without deteriorating the image quality due to the ghost images. In the embodiment, the TFT 71C is displaced by a distance L longer than the distance of each TFT along the direction in which the data line extends, and the source wiring line of the TFT 71C toward the outer direction of the group is displaced so as not to be opposite to the TFT 71C of the adjacent group. In other words, the source wiring line of the TFT 71C toward the outer direction of the group is terminated at a position (that is, position opposite to each other) surrounded by the drain wiring line toward the outer direction of the adjacent group. Accordingly, the parasitic capacitance is significantly reduced between the source wiring line of the TFT 71C toward the outer direction of the group and the drain wiring line toward the outer direction of the adjacent group.

Here, by separating the TFT 71C from the arrangement of the TFT 71A, the gap between the TFTs 71A can be reduced by the width of the TFT 71C. Accordingly, the capacitance between groups can be reduced and the pitch between the wiring lines can be reduced (without deteriorating the image quality), such that it is possible to implement a high definition display panel 100.

Figure 13:
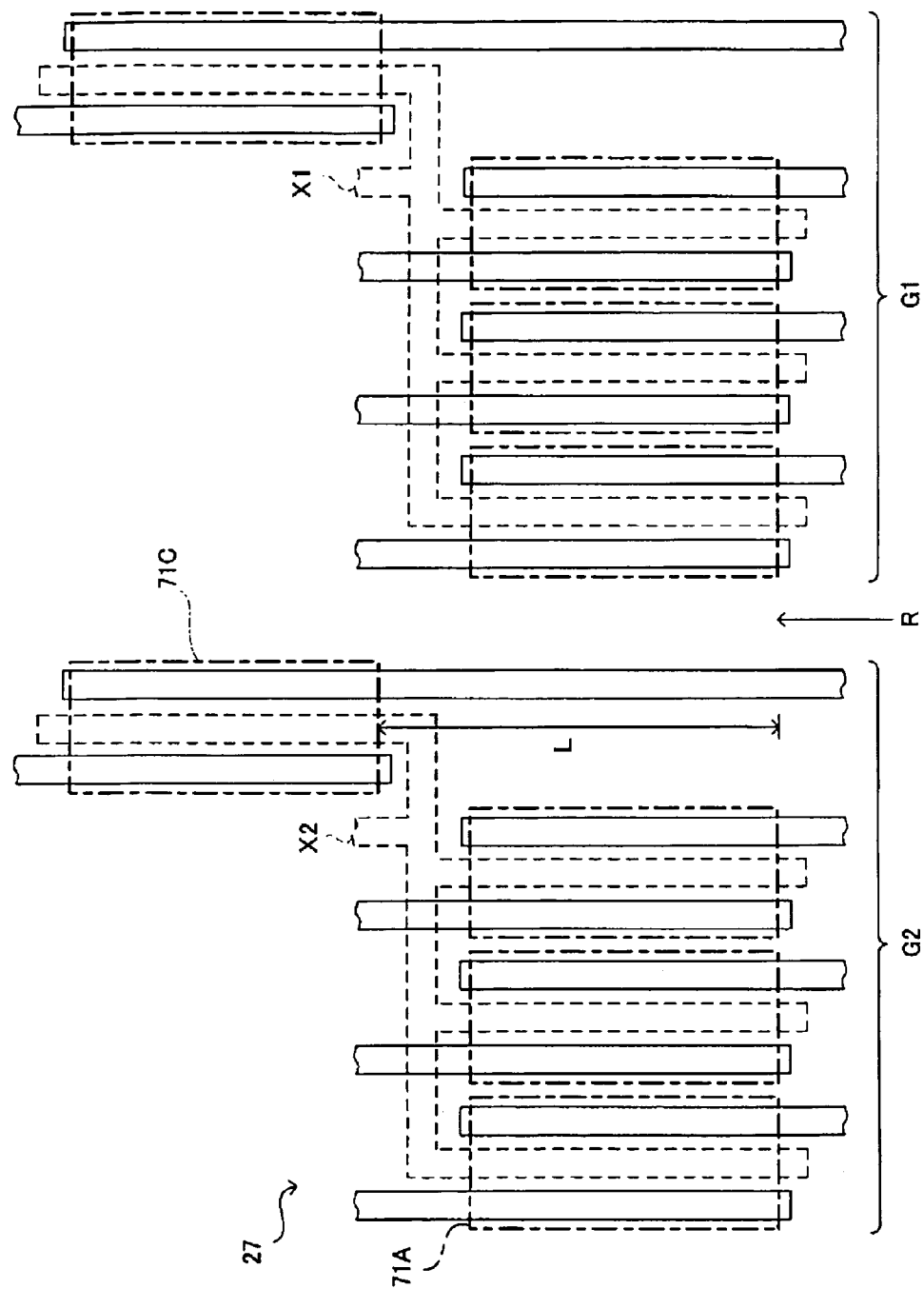
FIG. 13 is a layout diagram of wiring lines of a sampling circuit according to a modification of the third embodiment of the present invention.

As illustrated in FIG. 13, according to a modification of the embodiment, a configuration in which the TFT 71C at the side opposite to that illustrated in FIG. 12 is displaced can be adopted. In this case, the drain wiring line of the TFT 71C toward the outer direction of the group is wired while including positions (that is, positions opposite to each other) surrounded by the source wiring line toward the outer direction of the adjacent group. Accordingly, when compared to the third embodiment illustrated in FIG. 12, the parasitic capacitance reduction effect is somewhat lessened. However, in the present modification, the parasitic capacitance reduction effect corresponding to that of the embodiment can be obtained and the gap between the TFTs 71A that constitute the sampling circuit can be reduced. As described in the first embodiment and the modification thereof, in another modification, when the source wiring lines or the drain wiring lines of the sampling TFTs 71 adjacent to each other with the boundary R interposed therebetween are arranged to be adjacent to each other, the capacitance between the groups can be further reduced.

Next, various electronic apparatuses to which the electro-optical devices described above are applied will now be described.

Figure 14:
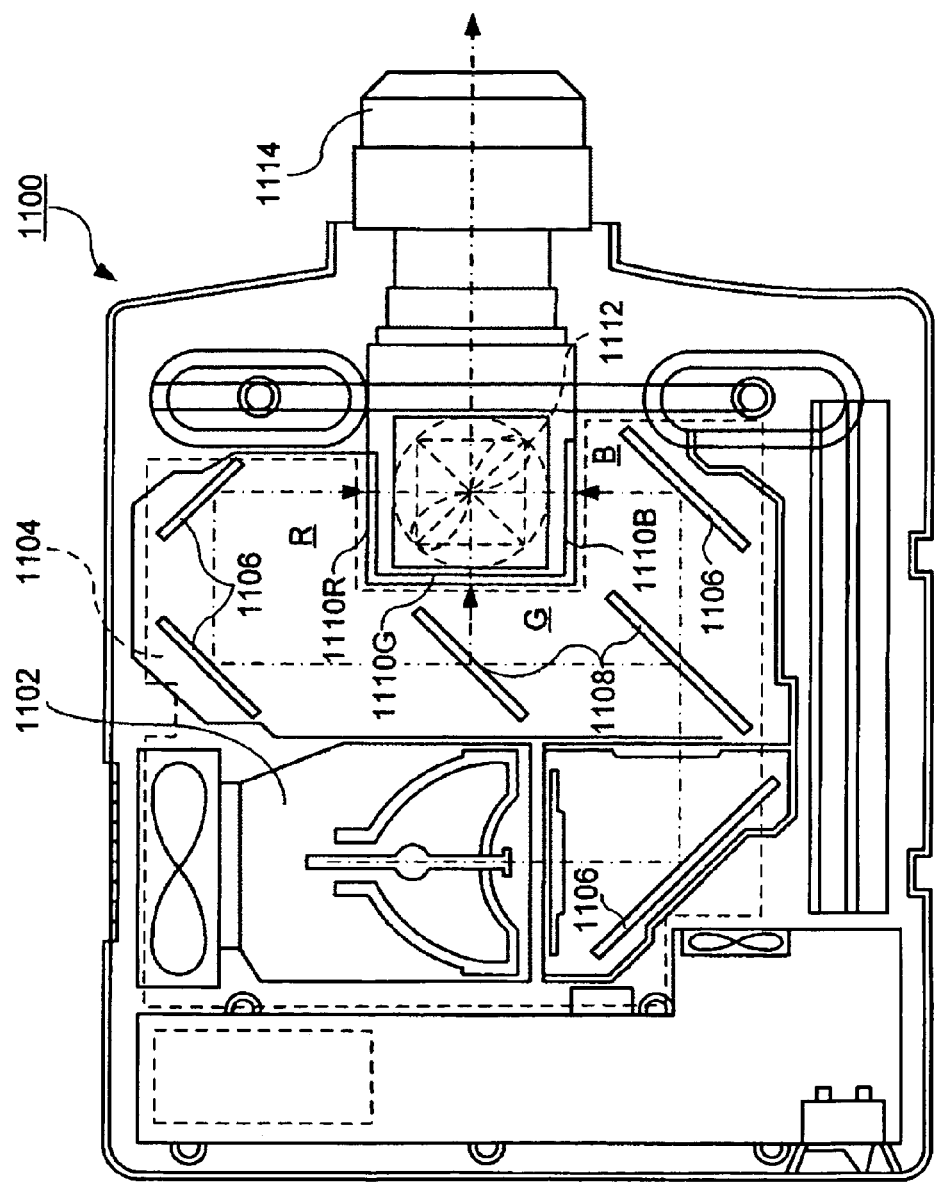
FIG. 14 is a cross-sectional view illustrating the configuration of a projector, which is an example of an electronic apparatus to which an electro-optical device is applied.

First, a projector in which a liquid crystal device that is one of the above-mentioned electro-optical devices is used as a light valve will be now described. FIG. 14 is a plan view showing an example of the construction of the projector. As illustrated in FIG. 14, a lamp unit 1102 composed of a white light source, such as a halogen lamp, is provided in the projector 1100. Light emitted from the lamp unit 1102 is separated into three primary colors, R (red), G (green) and B (blue), by four mirrors 1106 and two dichroic mirrors 1108 which are arranged in a light guide 1104, and the light is incident on liquid crystal devices 1110R, 1110B and 1110G, which are light valves corresponding to the respective primary colors. The constructions of the liquid crystal devices 1110R, 1110B, and 1110G are the same as that of the above-mentioned electro-optical device and signals of primary colors R, G and B that are supplied from an image signal processing circuit are modulated. Then, light modulated by means of the liquid crystal devices is incident on a dichroic prism 1112 from three directions. In the dichroic prism 1112, R and B light is refracted by 90 degrees, but G light goes straight through. Accordingly, images of the respective colors are combined and pass through a projecting lens 1114, and thus a color image is projected onto a screen or the like.

Figure 15:
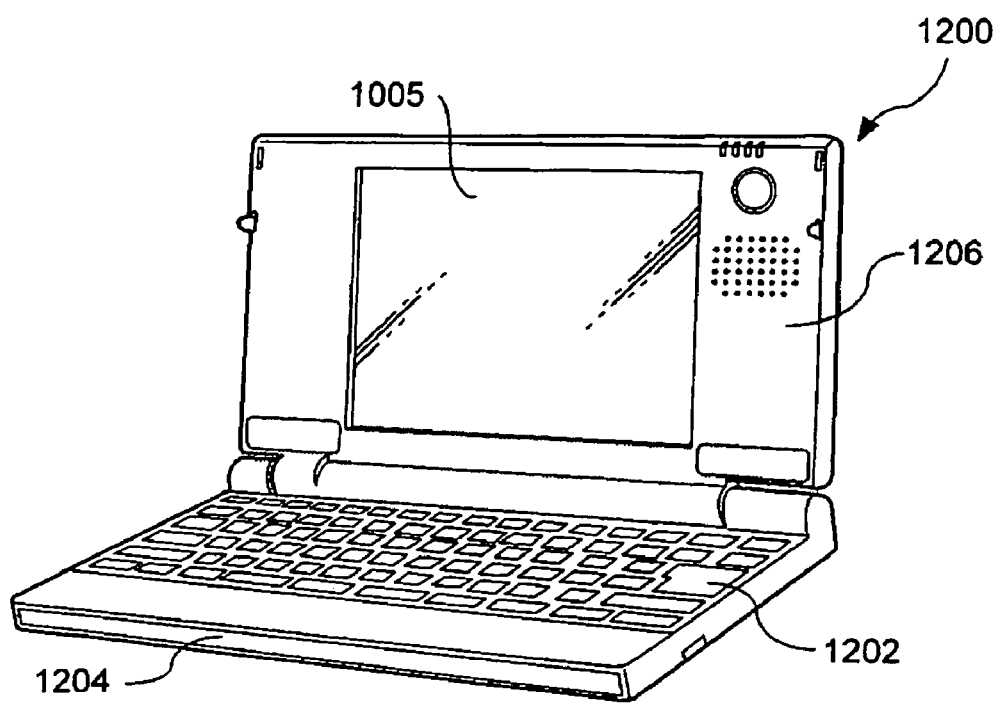
FIG. 15 is a cross-sectional view illustrating the configuration of a personal computer, which is an example of an electronic apparatus to which an electro-optical device is applied.

Next, an example in which a liquid crystal device that is one of the above-mentioned electro-optical devices is applied to a mobile personal computer will be now described. FIG. 15 is a perspective view showing the construction of the personal computer. In FIG. 15, a personal computer 1200 comprises a main body portion 1204 provided with a keyboard 1202 and a liquid crystal display unit 1206. The liquid crystal display unit 1206 is constituted by adding a backlight to a liquid crystal device 1005 that is one of the above-mentioned electro-optical devices.

Figure 16:
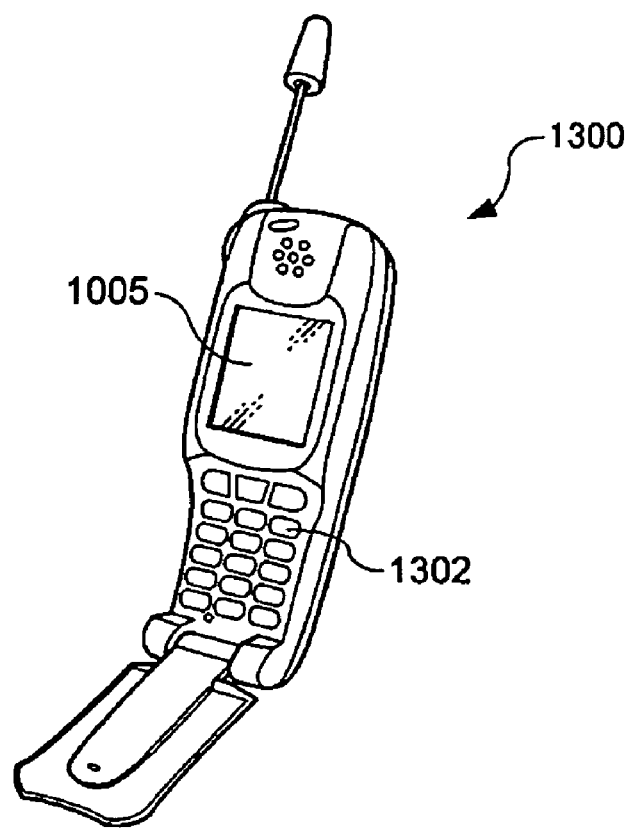
FIG. 16 is a cross-sectional view illustrating the configuration of a cellular phone, which is an example of an electronic apparatus to which an electro-optical device is applied.

In addition, an example in which a liquid crystal device that is one of the above-mentioned electro-optical devices is applied to a cellular phone will be now described. FIG. 16 is a perspective view showing the construction of the cellular phone. In FIG. 16, a cellular phone 1300 is provided with a plurality of operating buttons 1302 and a reflection-type liquid crystal device 1005 that is one of the above-mentioned electro-optical devices. If necessary, on a front surface of the reflection-type liquid crystal device 1005, a front light is provided.

In the above-mentioned description, the liquid crystal device is described as a specific example of the electro-optical device of the invention. However, other than the liquid crystal device, the electro-optical device of the invention can be applied to an electrophoresis device, such as electronic paper, and to a display device using an electron-emitting element (field emission display and surface-conduction electron-emitter display). In addition, other than the above-described electronic apparatuses, the electro-optical device of the present invention can be applied to various electronic apparatuses such as a television receiver, a view-finder-type or a monitor-direct-view-type video tape recorder, a car navigation device, a pager, an electronic pocketbook, an electronic calculator, a word processor, a workstation, a videophone, a POS terminal, and a device comprising a touch panel.

The invention is not limited to the above-mentioned exemplary embodiments, but can be modified without departing from the subject matter and spirit of the invention read from the claims and specification. In accordance with such a modification, it should be understood that a driving circuit, an electro-optical device including the driving circuit, and an electronic apparatus also fall within the technical scope of the invention.

What is claimed is:

1. An electro-optical device, comprising:
   a substrate;
   a plurality of scanning lines and a plurality of data lines that are arranged so as to cross each other in an image display region on the substrate; and
   a plurality of pixel portions that are coupled to the plurality of scanning lines and the plurality of data lines,
   n image signal lines provided on a peripheral area located on a periphery of the image display area on the substrate, n (where n is a natural number equal to or greater than two) serial to parallel converted image signals being supplied to the n image signal lines,
   a sampling circuit provided on the peripheral area, the sampling circuit including a plurality of thin film transistors, each having (i) a drain that is coupled to a drain wiring line arranged from the data line in a direction in which the data line extends, (ii) a source that is coupled to a source wiring line arranged from the image signal line in a direction in which the data line extends, and (iii) a gate that is arranged to be sandwiched between the drain wiring line and the source wiring line in a direction in which the data line extends, the plurality of thin film transistors being arranged to correspond to the plurality of data lines; and
   a data line driving circuit that supplies sampling circuit driving signals to the gate of the thin film transistors of the sampling circuit, the data line driving circuit supplying the same sampling circuit driving signal to the gates of all of the thin film transistors within the same group of n thin film transistors that are coupled to n simultaneously driven data lines among the plurality of data lines, and
   two adjacent thin film transistors of the sampling circuit are located adjacent to each other and on opposite sides of a boundary between thin film transistor groups, the two adjacent thin film transistors having the opposite arrangement of source and drain wiring lines so that the sources of the two adjacent thin film transistors are arranged between the two drains of the two adjacent thin film transistors in plan view.

2. The electro-optical device according to claim 1, the n thin film transistors in every group having a same arrangement, except one of the two adjacent thin film transistors with the boundary interposed therebetween.

3. The electro-optical device according to claim 1, the n thin film transistors in every group being uniformly arranged, and the n thin film transistors between two adjacent groups being arranged oppositely to each other.

4. The electro-optical device according to claim 1, in each of the plurality of thin film transistors, the source and drain wiring lines, in which a gate is interposed therebetween according to an arrangement order of the transistors, being alternately opposite to each other, and n being an even number.

5. The electro-optical device according to claim 1, the source wiring lines of the two adjacent thin film transistors with the boundary between thin film transistor groups interposed therebetween being arranged to be adjacent to each other.

6. The electro-optical device according to claim 1, the drain wiring lines of the two adjacent thin film transistors with the boundary between thin film transistor groups interposed therebetween being arranged to be adjacent to each other.

7. An electronic apparatus having an electro-optical device, the electro-optical device comprising:
   a substrate;
   a plurality of scanning lines and a plurality of data lines that are arranged so as to cross each other in an image display region on the substrate; and
   a plurality of pixel portions that are coupled to the plurality of scanning lines and the plurality of data lines,
   n image signal lines provided on a peripheral area located on a periphery of the image display area on the substrate, n (where n is a natural number equal to or greater than two) serial to parallel converted image signals being supplied to the n image signal,
   a sampling circuit provided on the peripheral area, the sampling circuit having a plurality of thin film transistors each having (i) a drain that is coupled to a drain wiring line arranged from the data line in a direction in which the data line extends, (ii) a source that is coupled to a source wiring line arranged from the image signal line in a direction in which the data line extends, and (iii) a gate that is arranged to be sandwiched between the drain wiring line and the source wiring line in a direction in which the data line extends, the plurality of thin film transistors being arranged to correspond to the plurality of data lines; and
   a data line driving circuit that supplies sampling circuit driving signals to the gate of the thin film transistors of the sampling circuit, the data line driving circuit supplying the same sampling circuit driving signal to the gates of all of the thin film transistors within the same group of n thin film transistors that are coupled to n simultaneously driven data lines among the plurality of data lines, and
   two adjacent thin film transistors of the sampling circuit are located adjacent to each other and on opposite sides of a boundary between thin film transistor groups, the two adjacent thin film transistors having the opposite arrangement of source and drain wiring lines so that the sources of the two adjacent thin film transistors are arranged between the two drains of the two adjacent thin film transistors in plan view.

8. An electro-optical device, comprising:
   a substrate;

a plurality of scanning lines and a plurality of data lines that are arranged so as to cross each other in an image display region on the substrate; and a plurality of pixel portions that are coupled to the plurality of scanning lines and the plurality of data lines, n image signal lines provided on a peripheral area located on a periphery of the image display area on the substrate, n (where n is a natural number equal to or greater than two) serial to parallel converted image signals being supplied to the n image signal lines, a sampling circuit provided on the peripheral area, the sampling circuit including a plurality of thin film transistors, each having (i) a drain that is coupled to a drain wiring line arranged from the data line in a direction in which the data line extends, (ii) a source that is coupled to a source wiring line arranged from the image signal line in a direction in which the data line extends, and (iii), a gate that is arranged to be sandwiched between the drain wiring line and the source wiring line in a direction in which the data line extends, the plurality of thin film transistors being arranged to correspond to the plurality of data lines; and a data line driving circuit that supplies sampling circuit driving signals to the gate of the thin film transistors of the sampling circuit, the data line driving circuit supplying the same sampling circuit driving signal to the gates of all of the thin film transistors within the same group of n thin film transistors that are coupled to n simultaneously driven data lines among the plurality of data lines, and two adjacent thin film transistors of the sampling circuit are located adjacent to each other and on opposite sides of a boundary between thin film transistor groups, the two adjacent thin film transistors having the opposite arrangement of source and drain wiring lines so that the drains of the two adjacent thin film transistors are arranged between the two sources of the two adjacent thin film transistors in plan view.

* * * * *